Patented Dec. 15, 1931

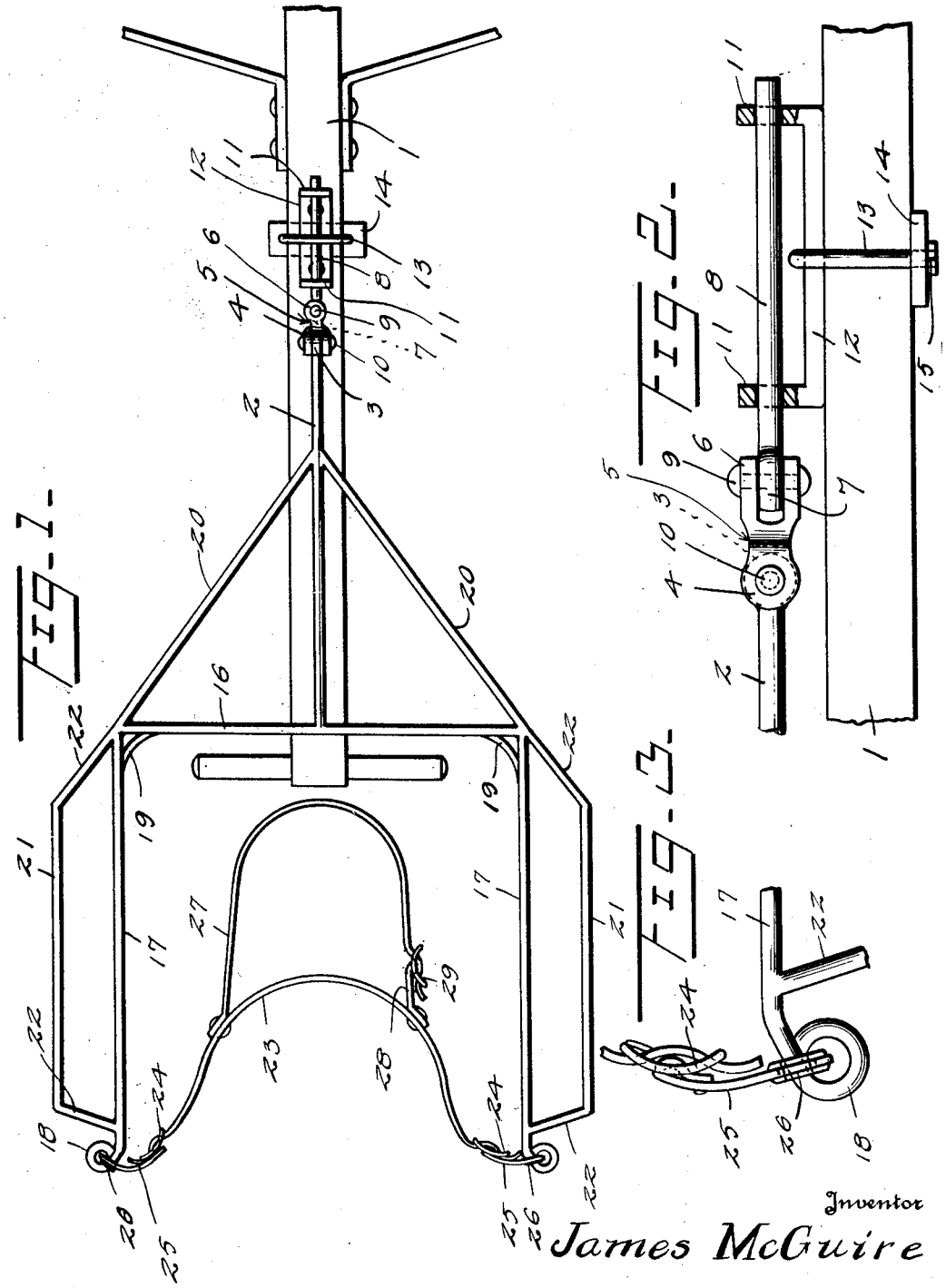

1,836,609

UNITED STATES PATENT OFFICE

JAMES McGUIRE, OF NATIONAL SOLDIERS HOME, VIRGINIA

HANDLE ATTACHMENT FOR GARDEN IMPLEMENTS

Application filed July 12, 1930. Serial No. 467,579.

This invention relates to attachments for hand operated gardening implements, more particularly lawn mowers.

The primary object of the present invention is to provide a device designed for attachment to the handle of a lawn mower or other gardening implement where a handle is provided by means of which the operator may control the implement, which is designed to lighten the burden of the person operating the implement by making it easier for him to support the handle thereof and to apply the necessary force thereto to propel it over the ground.

Another object of the invention is to provide a device for attachment to the handles of garden implements, which connects with the garden implement handle at a point adjacent the forward end thereof or in other words in close proximity to the implement so that the force applied by the pusher of the implement will be directed against the handle at the forward end instead of at the back end thereof as would be the case if the attachment were not employed, thereby reducing the amount of effort necessary on the part of the operator to propel the implement.

Still another object of the invention is to provide an attachment of the above described character by means of which a minimum effort is necessary on the part of the operator to support the handle of the implement while operating the same as the weight of the handle is borne by the operator's shoulders thus leaving both hands for propelling the implement.

Other objects and advantages of the present device will become apparent as the description of the same proceeds and the invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a view in top plan of the device embodying the present invention showing the same attached to the handle of a lawn mower.

Figure 2 is a view in side elevation of a portion of the lawn mower handle showing the connection of the attachment thereto.

Figure 3 is an enlarged view of the eye of the frame showing the connection of the breast strap thereto.

Referring more particularly to the drawings wherein like numerals of reference indicate corresponding parts throughout the several views, the numeral 1 indicates generally the handle of a garden implement such for example as a lawn mower, to which handle the attachment embodying the present invention is designed to be secured.

The present lawn mower attachment comprises a center push rod 2 which at its forward end is formed to provide an eye 3 which is pivotally connected between a pair of ears 4 of a universal joint link which is indicated generally by the numeral 5. The ears 4 of the link 5 are, as shown, formed at one end thereof while at the other end a second pair of ears is formed which pair is indicated by the numeral 6. The ears 6 are disposed in a plane at right angles to the plane occupied by the ears 4 so that the pivotal axis about which the eye 3 of the rod 2 turns will be at right angles to the axis about which the eye 7 of the short pin 8 turns when the pin and the rod are connected by the link 5. The eye 7 is, of course, disposed between the ears 6 of the universal coupling link and these ears are connected to the eye 7 by a pin 9 while the ears 4 are connected to the eye 3 by the pin 10.

The pin 8 which forms an extension of the push rod 2 is extended through the up-turned ends 11 of an elongated plate 12 which is designed to push upon the top of the mower handle 1 in the manner shown and this pin 8 and the plate 12 are secured to the handle by the U-bolt 13 which straddles them and also the handle 1 and has its ends connected by the plate 14 which extends across the under face of the handle and is secured in position by the nuts 15 upon the ends of the bolt.

At its rear end the push rod 2 joins a substantially U-shaped frame which is disposed in a plane parallel with the rod and which frame comprises a cross bar 16 intermediate the ends of which the rear end of the push rod 2 is secured, and the rearwardly extending side bars 17, each of which at its free end terminates in an eye 18.

The angle formed between the forward ends of the side members or bars 17 of the frame and the cross bar 16 thereof is braced by an angle bar 19 in the manner shown.

The ends of the cross bar 16 of the U-shaped frame are also connected to the push rod 2 by the brace bars 20 which extend forwardly and join the push bar 2 at a point intermediate its ends.

Disposed at each side of the U-shaped frame and parallel with each side bar 17 thereof is a hand grip bar 21 which is joined at each end to the adjacent side bar 17 by the inturned terminal portions 22.

Connecting the eyes 18 of the side bars 17 is a relatively broad strap 23 each end of which has connected thereto by means of a buckle 24 a tab 25 through which is formed a reinforced eye or opening 26 which receives the adjacent eye 18. By means of this buckle 24 the ends of the strap 23 which is designed to extend across the breast of the operator of the implement to which the device is attached may be adjusted to suit the convenience of the operator.

Adjacent one end, the breast strap 23 has secured thereto one end of a neck strap 27 and adjacent the other end of the breast strap a short strap 28 is secured which carries a buckle 29 by means of which the free end of the neck strap 27 may be attached to the breast strap.

When in use the forward end of the device is secured to the handle of the lawn mower or any other gardening implement at a point adjacent the forward end thereof and the operator adjusts the breast strap 23 across his breast and passes the neck strap 27 around behind his neck and connects the free end thereof to the buckle 29.

The rear open end of the frame which is made up of the bars 16 and 17 will thus be supported from the neck and shoulders of the operator and by pushing forward pressure may be applied to the breast strap and transmitted through the rod 2 to the forward end of the mower handle 1. The hands of the operator may be employed to support the rear end of the handle or, if desired, the rear end of the handle may be secured in any suitable manner as for example by the use of a strap or the like, to the bar 16 of the frame and the operator's hands may then be employed to grasp the bars 21 at the sides of the frame.

From the foregoing it will be readily seen that by using a device of the character herein described in association with an implement of the nature of a lawn mower the work of operating such an implement will be greatly reduced and thus it will be possible for the operator to do a great deal more work with the implement than would be possible if the attachment were not employed.

Having thus described my invention, what I claim is:

1. An attachment for the handle of a hand operated garden implement, comprising a push rod, a pin member, a universal connection between said rod and pin member, means for securing said pin member to and longitudinally of the implement handle, a substantially U-shaped frame having said push rod connected to the transverse portion thereof and having its open side directed rearwardly of the push rod, a harness connecting across the open side of said U-shaped frame for securing the frame to the body of an operator of the implement, and a hand grip at each side of said U-shaped frame, comprising a longitudinally extending bar arranged in spaced parallel relation to the side of the frame and having an inturned portion at each end connected to the adjacent side bar.

2. An attachment for a handle of a hand operated garden implement, comprising an elongated bar member, a pin member having pivotal connection at one end with one end of said bar member, a support for said pin member adapted to be positioned upon the implement handle, means for securing said support to the implement handle whereby it may be shifted longitudinally of the handle, a frame having parallel side bars and a forward cross connecting bar therebetween attached at the center of the cross connecting bar to the other end of the first mentioned bar, and a body harness connected with those ends of the side bars of the frame remote from the cross connecting bar.

3. An attachment for a handle of a hand operated garden implement comprising a plate having spaced upturned ears, a pin member supported by said ears, said plate being designed to be positioned upon the implement handle, means for securing the plate to the implement handle permitting longitudinal adjustment of the plate thereon, a bar, a universal connection between one end of said bar and one end of said pin, a bar member disposed transversely of the other end of said first bar, spaced parallel side bars each extending rearwardly from one end of said bar member and each terminating at its free end in an eye, and a body harness connected with the eyes of said side bars.

4. An attachment for a handle of a hand operated garden implement, comprising an elongated bar member, means for attaching said bar member at one end to the implement handle, a frame comprising a pair of spaced side bars and a cross bar connecting said side bars at one end, said cross bar being joined midway between its ends with the other end of the first mentioned bar, a pair of brace bars disposed in rearwardly diverging relation with respect to the first mentioned bar and having their convergent ends joined thereto at points intermediate the ends of the same, said brace bars being extended beyond the forward corners of said frame and joined thereto, hand grasp bars disposed at the sides of the frame and each forming a rearward continuation of a brace bar and each further being connected at its rear end with the adjacent frame side bar, and a body harness connecting the free rear ends of the frame side bars.

In testimony whereof I hereunto affix my signature.

JAMES McGUIRE.